April 8, 1952
D. C. MOORE
2,591,711
REVERSIBLE PLOW
Filed May 29, 1947
2 SHEETS—SHEET 1
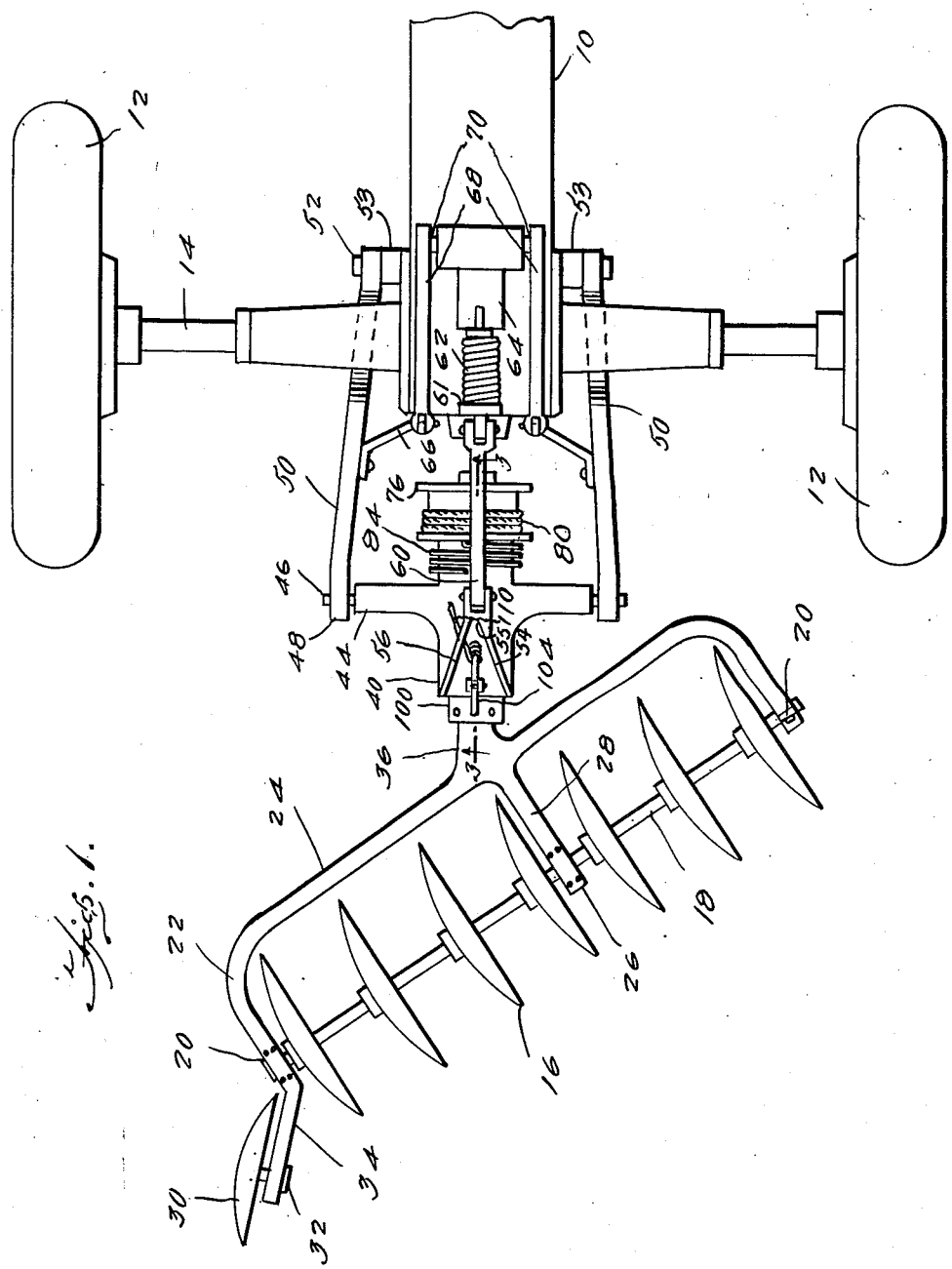
INVENTOR.
Donald C. Moore
BY
McMorrow, Berman & Davidson
ATTORNEYS April 8, 1952 D. C. MOORE 2,591,711
REVERSIBLE PLOW
Filed May 29, 1947 2 SHEETS—SHEET 2
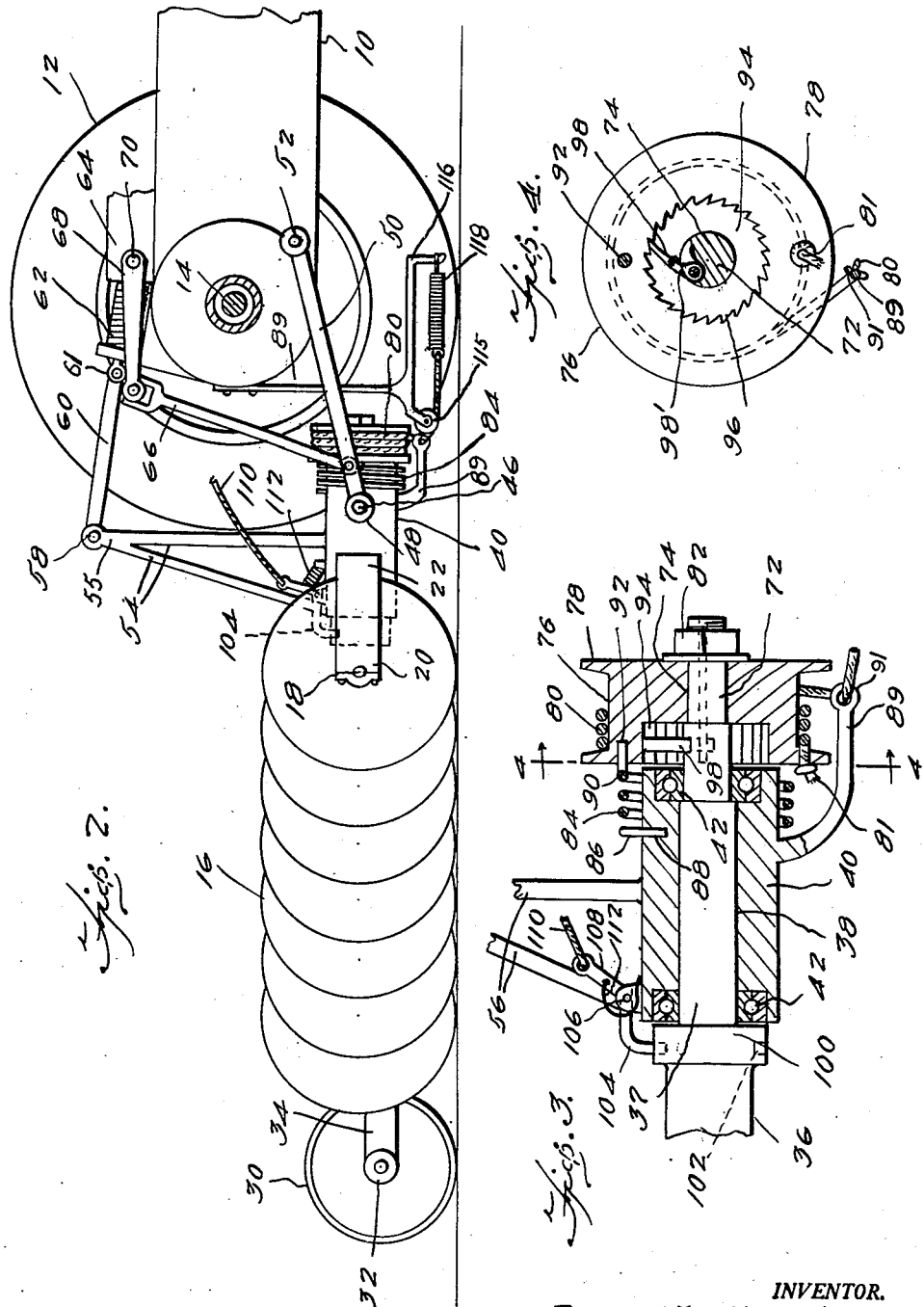
INVENTOR.
Donald C. Moore
BY
McMorrow, Berman & Davidson
ATTORNEYS Patented Apr. 8, 1952

2,591,711

UNITED STATES PATENT OFFICE 2,591,711

REVERSIBLE PLOW

Donald C. Moore, Okmulgee, Okla.

Application May 29, 1947, Serial No. 751,216

2 Claims. (Cl. 97—26)

This invention relates to plows.

An object of the invention is to provide a plow having a frame with a plurality of discs thereon, and having means for turning over the frame when desired.

Another object of the invention is to provide a plow of the type in which a plurality of discs are carried on a frame, the discs being turned at an angle to the line along which the plow is being drawn, the plow being provided with a device for turning the frame over at the end of each row when the plow is to reverse direction, so as to cast the earth in the same general direction in each plowed row.

A further object of the invention is to provide a plow turning device including a spindle upon which the plow frame is journaled in the plow housing, with a cable actuated spindle turning device operable upon elevation of the plow at the end of each row plowed, power for elevating the plow being derived from the tractor to which it is attached, or other suitable power source.

Still another object of the invention is to provide a plow which is simple in design, relatively inexpensive to manufacture, and highly effective for the purpose intended.

Other objects and advantages of the invention will become apparent from the following description of a preferred embodiment thereof as illustrated in the accompanying drawings, and in which, Figure 1 is a top plan view of my improved plow and the tractor to which it is attached.

Figure 2 is an elevational view of the tractor shown in Figure 1,

Figure 3 is a longitudinal fragmentary sectional elevation of the plow turning mechanism, and Figure 4 is a transverse sectional elevation taken on line 4—4 of Figure 3.

In the use of a disc plow, it becomes necessary to change the angle of the discs relative to the direction of the row at the end of each row, before starting on the next row. This is necessary in order to continue to throw the overturned earth in the same direction in all rows. The present invention discloses a device for changing the angle of the discs quickly and easily.

In order to understand clearly the nature of the invention and the best means for carrying it out, reference may now be had to the drawings, in which like numerals denote similar parts throughout all the views. As shown, there is a tractor having a tractor chassis 10 supported upon front wheels, not shown, and upon rear wheels 12 which are driven by means of power derived from the tractor engine through the axles 14.

A number of spaced discs 16 are carried on a disc shaft 18 which is journaled in bearings 20 formed in the end extensions 22 of the plow rail 24 which extends along the entire length of the disc shaft as shown best in Figure 1. The disc shaft 18 is also journaled intermediate its ends in a bearing 26 formed on the end of the leg 28, the other end of which is integral with the plow rail 24.

A wheel disc 30 having a cutting edge is carried on a stub shaft 32 on the end portion of a rearward extension 34 of one of the end extensions 22 of the plow rail. The plow rail 24 is integral with a forward extension or draw bar 36, the plow rail being inclined obliquely relative to the orientation of the axis of the forward extension or draw bar 36. The draw bar 36 has its forward end reduced to form a spindle 37 to enter a bore 38 formed in a turning housing 40, being journaled therein in anti-friction bearings 42.

The housing 40 is securely carried by arms 44 extending laterally one from each of two opposite sides thereof, as best seen in Figure 1, with bearing pin portions 46 on the outer ends of the arms journaled in the rearward ends of spaced apart tension links 50. The forward ends of the tension links are apertured to receive bearing pin portions 52 on the outer ends of transversely aligned extensions 53 of the tractor chassis.

A bracket 55 having upstanding arms 54 and 56 joined at their upper ends and welded at their lower ends to the housing 40 extends upwardly from the housing. The bifurcated upper end of the interconnected arms 54 and 56 is pinned at 58 to a compression link 60, the forward end of which is pinned to the rearward end of a plunger 61 controlled by a spring 62 engaging the tractor body 10 at 64. Struts 66 are pinned at their lower ends to the tension links 50 and are coupled at their upper ends to the rearward or distal ends of lifting links 68, the forward ends of which are keyed to the ends of a power operated lift shaft 70 extending out of the housing 64 of the tractor body and rotatable by means of power derived from the tractor engine.

It is apparent that rotation of the lift shaft 70 in a clockwise direction as seen in Figure 2, will cause the turning housing 40 and the plow rail 24 to be elevated above the ground, together with the discs 16 carried thereby.

The forward end 72 of the spindle 37 extends through a bore 74 formed in a cylindrical drum 76 having end flanges 78 and adapted for having a rope 80 wound around the drum. A nut 82 is threaded on the end of the spindle 72 to retain the parts together, the drum being rotatable on the spindle. A torsion spring 84 encircles the turning housing 40 and has one end 86 engaged in a socket 88 in the housing 40, the other end 90 of the spring being likewise engaged in a socket 92 in the side of the drum 76.

The drum 76 has an annular interior concentric recess 94 formed therein, the outer surface of which has ratchet teeth 96 formed therein. A ratchet pawl 98 has its inner end pinned into a recess formed in the spindle 72, as shown best in Figure 4, the outer end of the pawl being adapted to engage with the teeth 96 under the influence of a spring 98' also carried by the spindle. It is apparent that with the housing 40 and the plow elevated, a pull on the free end of the rope 80, the other end of which is anchored at 81 to the drum, will turn the drum 76 and the spindle 37, together with the plow rail 24 and the discs, at the same time stressing the spring 84.

A collar 100 which is integral with the spindle 37, has two diametrically spaced socket apertures 102 formed therein for the reception of a detent 104 which is carried on a pivot pin 106, the lever arm 108 of the detent being attached to a rope 110 the other end of which is accessible to the tractor operator, being tied near his seat. A spring 112 biases the detent into engagement with the nearest socket 102, preventing the spindle 37 from turning until desired.

The free end of rope 80 is passed through an eye 91 on the distal end of an arm 89, the opposite end of which is secured to the under side of housing 40, so that the arm depends downwardly from the housing. The rope is then carried over a sheave 115 journaled on an arm adjacent one end of a frame 116 secured to and depending from the tractor chassis. The free end of the rope is then attached to the adjacent end of a coil, tension spring 118, the opposite end of which is connected to the end of frame 116 remote from arm 89.

When the operator of the tractor has plowed a row, and is about to make a U-turn to start plowing the next row, he causes the lift shaft 70 to be actuated, elevating the housing 40 and the plow rail 24 with its discs. This pulls on rope 80 stretching spring 118 and the operator of the tractor then pulls on the rope 110, disengaging the detent 104 from the sockets 102, the spindle 37 being then free to rotate about its axis. Spring 118 then contracts, pulling on rope 80 and winding rope 80 off from the drum 76 to rotate drum 76 and spindle 37 to invert the plow and to wind or stretch the spring 84.

The rope 110 is then released, allowing the detent 104 to engage the nearest socket 102. The lift shaft 70 is then actuated, at the completion of the turn to lower the plow assembly. This slacks the rope 80 which is now unwound off the drum, allowing the spring 84 to unwind and turn the drum sufficiently to rewind the rope thereon, the ratchet pawl 98 yielding for this purpose due to the counter-rotation of the drum.

The angular inclination of the plow discs has now been changed to allow the earth in the next row to be cast in the same direction as in preceding rows.

Although I have described a preferred embodiment of my invention in specific terms, it is to be understood that various changes may be made in size, shape, materials and arrangement without departing from the spirit and scope of the invention as claimed.

I claim:

1. Means for connecting a reversible implement to a tractor for pulling and lifting of the implement by the tractor and inverting the implement while lifted to reverse its operation comprising a housing having a bore therethrough, arms projecting laterally from said housing at respectively opposite sides of the latter and substantially in alignment with each other, link means pivotally connected to the outer ends of said arms for tractively connecting said housing to a tractor while providing freedom of vertical movement of said housing, said link means being power operated to raise and lower said housing, a bracket secured at one end to said housing and upstanding therefrom, said bracket being connectible at its upper end to a tractor to limit tilting movement of said housing about the axis of the pivotal connection between said arms and said links, an implement drawbar journaled in the bore of said housing, means on said drawbar restraining the latter against longitudinal movement relative to said housing while providing freedom of rotational movement of said drawbar in said bore, a drum journaled on said drawbar, a tractor supported frame adjacent said drum, a tension spring connected at one end to said frame, a strand wound on said drum and connected to the other end of said tension spring for applying a drawbar rotating pull to said drum when said housing is raised, a manually operated latch carried by said housing and engaging said drawbar to delay rotation of said drawbar until said latch is manually released, said tension spring permitting raising of said housing without rotating said drum and acting to rotate said drum and said drawbar when said latch is released with said housing in raised position, a one way drive connection between said drum and said drawbar permitting return rotation of said drum when said housing is lowered, and a torsion spring connected between said housing and said drum for returning said drum to its original position after the drum has been rotated by said strand and said tension spring.

2. Means for connecting a reversible implement to a tractor for pulling and lifting of the implement by the tractor and manually controlled inverting of the implement while raised comprising a housing having a bore therethrough, power operated means connected to said housing for tractively connecting the housing to a tractor and raising and lowering the housing, an implement drawbar journaled in the bore of said housing, a drum journaled on said drawbar, a one way driving connection between said drum and said drawbar providing a driving connection between said drum and said drawbar for one direction of rotation of said drum while providing free rotation of said drum relative to said drawbar in the opposite direction of rotation, a tractor carried frame disposed below said housing, means resiliently connecting said drum to said frame for rotation of said drum in said one direction of rotation when said housing is raised, manually operated latch means connected between said housing and said drum for delaying rotation of said drum and conditioning said resilient means to rotate said drum in said one direction when said latch means is released with said housing in raised position, and resilient means connected between said housing and said drum providing return rotation of said drum in said opposite direction when said housing is lowered.

DONALD C. MOORE.

REFERENCES CITED

The following references are of record in the file of this patent:

UNITED STATES PATENTS

| Number    | Name   | Date          |
|-----------|--------|---------------|
| 1,243,072 | Juran  | Oct. 16, 1917 |
| 1,721,456 | Lee    | July 16, 1929 |
| 1,807,731 | Ehricke| June 2, 1931  |
| 2,227,366 | Pridgen| Dec. 31, 1940 |
| 2,429,463 | Hurlimann | Oct. 21, 1947 |

FOREIGN PATENTS

| Number  | Country     | Date          |
|---------|-------------|---------------|
| 18,032  | Australia   | Aug. 13, 1934 |
| 638,191 | France      | Feb. 14, 1928 |
| 875,681 | France      | June 29, 1942 |
| 437,135 | Germany     | Nov. 15, 1926 |
| 236,949 | Switzerland | July 16, 1945 |

OTHER REFERENCES

"Two Way Plow," circular (2 pp.) published before Jan. 1, 1947, by Harry Ferguson, Inc., Detroit 3, Michigan, describing Model LP–16–TW.